United States Patent [19]

Sugahara et al.

[11] Patent Number: 4,712,519
[45] Date of Patent: Dec. 15, 1987

[54] INTAKE MANIFOLD FOR A THREE-CYLINDER AIR-FUEL MIXTURE SUCTION TYPE ENGINE

[75] Inventors: Kooichi Sugahara; Yoshio Shinno; Kiyoharu Kimoto, all of Sakaishi, Japan

[73] Assignee: Kubota Ltd., Osaka, Japan

[21] Appl. No.: 834,789

[22] Filed: Feb. 28, 1986

[30] Foreign Application Priority Data

Mar. 11, 1985 [JP] Japan .................. 60-35270[U]

[51] Int. Cl.[4] .................................. F02B 75/18
[52] U.S. Cl. .................. 123/52 M; 123/547; 123/52 MC
[58] Field of Search ......... 123/52 M, 52 MB, 52 MC, 123/545, 547

[56] References Cited

U.S. PATENT DOCUMENTS

| | | | |
|---|---|---|---|
| 1,431,896 | 10/1922 | Rait | 123/52 M |
| 1,656,051 | 1/1928 | Fekete | 123/52 MC |
| 3,667,432 | 6/1972 | Greathouse | 123/52 M |
| 3,850,153 | 11/1974 | Sigwald | 123/52 M |
| 4,320,726 | 3/1982 | Etoh et al. | 123/198 F |
| 4,513,698 | 4/1985 | Senga et al. | 123/545 |

FOREIGN PATENT DOCUMENTS 1072920 9/1954 France .................. 123/52 M

*Primary Examiner*—Craig R. Feinberg
*Attorney, Agent, or Firm*—Schwartz, Jeffery, Schwaab, Mack, Blumenthal & Evans

[57] ABSTRACT

In an intake manifold for a multi-cylinder air-fuel mixture suction type engine according to the present invention, the manifold body is formed into a simplified hollow shell-shape which is elongate bilaterally. And a carburetor is installed on the one end side of the front wall of the manifold body in the state of facing obliquely to the other end side of the back plane thereof. Therefore, the liquid fuel particles in the air-fuel mixture sucked into the manifold body from the carburetor are distributed nearly uniformly to every cylinder through each intake port arranged bilaterally in the back plane of the manifold body, and hence the density of the air-fuel mixture in every cylinder can be nearly uniformized.

5 Claims, 7 Drawing Figures

INTAKE MANIFOLD FOR A THREE-CYLINDER AIR-FUEL MIXTURE SUCTION TYPE ENGINE

BACKGROUND OF THE INVENTION

1. Field of the Invention

The present invention relates to an intake manifold for a multi-cylinder air-fuel mixture suction type engine.

More particularly, it relates to an improved design for such an intake manifold, wherein the intake manifold body is formed into a hollow shell-shape and has an air-fuel inlet mixture opening formed on a wall thereof where a carburetor is installed and a large air-fuel mixture outlet openng which is formed through the greater part of the back face thereof and extended over all of the intake ports of the engine.

2. Prior Art

Generally, as compared with a branched type intake manifold, the above-mentioned intake manifold has such an advantage that it can be produced more readily and cheaper by a die casting because of its simple shape. And the prior art formation method of the air-fuel mixture inlet opening in the intake manifold is proposed, for example in U.S. Pat. No. 3,667,432 as shown in FIG. 6 and in U.S. Pat. No. 4,320,726 as shown in FIG. 7.

The intake manifold 101 of the engine $E_1$ shown in FIG. 6 has the air-fuel mixture inlet opening 111 formed upwardly in the middle portion of the upper wall of its body 110. However, since the liquid fuel particles in the air-fuel mixture sucked into the intake manifold body 110 from the carburetor 102 are apt to flow much more into the middle intake port 114$b$ than into other intake ports 114$a$,114$c$ due to its arrangement, the density of the mixture in the middle cylinder becomes over rich enough to cause an imperfect combustion and the density of the mixture in both sides cylinders becomes lean enough to cause a misfire.

On the other hand, the intake manifold 201 shown in FIG. 7 has the mixture inlet opening 211 which is formed leftwards in the left-side end wall of the bilaterally elongated body 210. The intake manifold 201 has such an advantage that the dimension of the engine $E_2$ can be made smaller because the carburetor 202 is disposed thereon without protruding outwardly beyond the manifold body 210. However, since the liquid fuel particles in the air-fuel mixture sucked into the manifold body 210 are apt to flow much more into the intake port 214$c$ disposed at the right end thereof than into other intake ports 214$a$,214$b$ by their kinetic inertia, the density of the mixture in the right end cylinder becomes over rich enough to cause an imperfect combustion and the density of the mixture in the middle and the left side cylinders becomes lean enough to cause a misfire. Especially, the misfire is caused more frequently in the left end cylinder than in the both ends cylinders shown in FIG. 6.

SUMMARY OF THE INVENTION

The present invention is directed to solving the problems noted above, and has the objects to supply the air-fuel mixture with its density uniformalized to every cylinder and to make the portion of the carburetor which protrudes outwardly beyond the intake manifold as small as possible.

This present invention accomplishes the above objects with an intake manifold for a three-cylinder air-fuel mixture suction type engine, wherein an air-fuel mixture inlet opening is formed outwardly and obliquely in one end wall portion of the wall of the manifold body in relation to the lengthwise direction thereof and the outside surface of the one end wall portion for installing a carburetor is arranged obliquely at an acute angle with respect to a back plane of the body.

Accordingly, the air-fuel mixture generated in the carburetor is sucked through the mixture inlet opening into the manifold body and then sucked in a state of branching through a respective intake port into every cylinder.

The liquid fuel particles in the air-fuel mixture sucked into the manifold body from the carburetor are apt to fly obliquely by their kinetic inertia. After their oblique flight, a portion of them flows into the intake port disposed at the rearward end side of a cylinder head near to the carburetor and the remaining portion sticks onto the cylinder head surface facing to the inside of the manifold body. The remaining portion is blown away toward the other end portion thereof by the flow of sucked mixture so as to be sucked into the middle cylinder and the other end cylinder in turn. Therefore, the liquid fuel particles are distributed uniformly to every cylinder. And the density of the air-fuel mixture in each cylinder becomes equivalent and appropriate value to continue the stable and good combustion. Hence, the imperfect combustion due to the over rich density of the sucked mixture and the misfire due to the lean density of the sucked mixtures are prevented effectively in every cylinder.

The foregoing and other objects and attendant advantages of the present invention will be readily appreciated as the same become better understood by reference to the following detailed description when considered by the accompanying drawings, wherein:

DETAILED DESCRIPTION OF THE PREFERRED EMBODIMENTS

Figure 4:
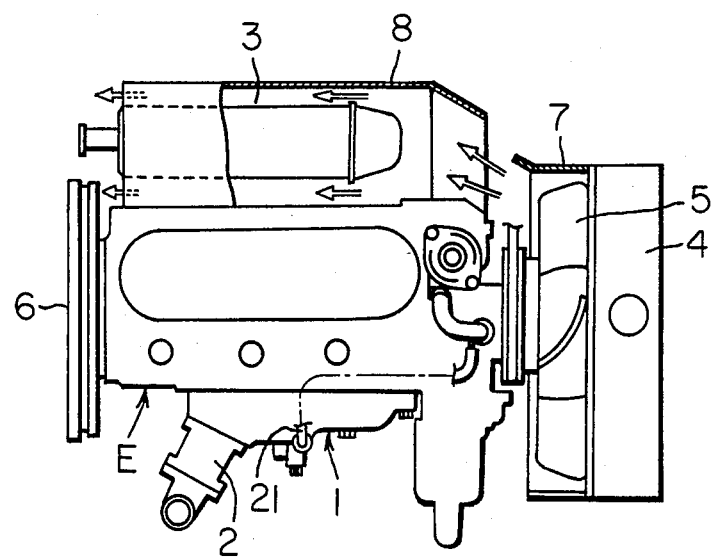
FIG. 4 is a schematic general plan view showing the engine according to the present invention.

As shown in FIG. 4, a water-cooled petrol 3-cylinder engine E includes an intake manifold 1 at the fore side thereof, a carburetor 2 conected to an air cleaner (not shown in Figs.), an exhaust gas manifold (not shown in Figs.) connected to a muffler 3, a radiator 4 provided with a cooling fan 5 at the right side thereof and a output flywheel 6 at the left side thereof. A portion of a cooling air delivered out of a shroud 7 is introduced around the muffler 3 through a cowling 8 in order to cool the muffler 3.

Figure 1:
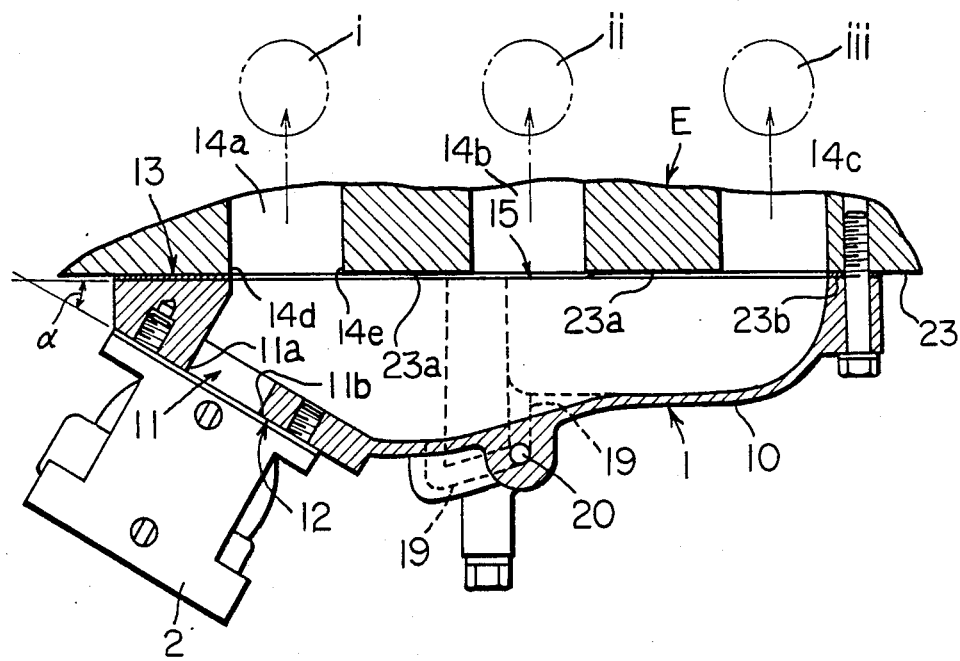
FIG. 1 is a transverse horizontal sectional view of an intake manifold of the present invention.
Figure 2:
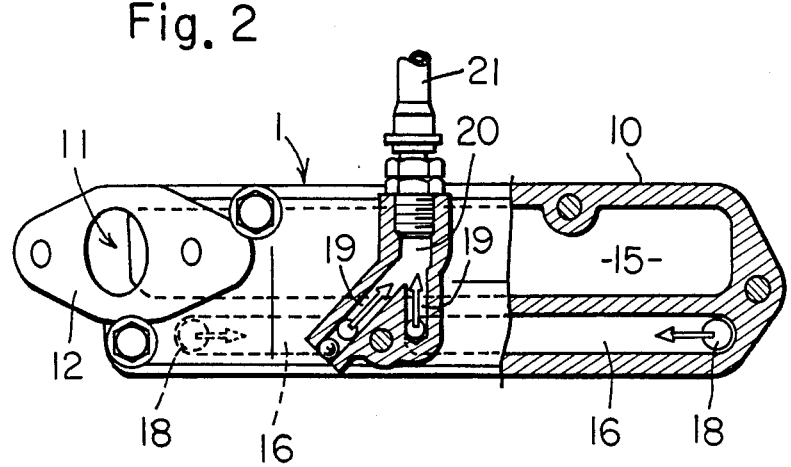
FIG. 2 is an elevational view partly in section and broken of the intake manifold in FIG. 1.

As shown in FIGS. 1 and 2, the body 10 of the intake manifold 1 is formed into a hollow shell-shape elongated bilaterally by means of a die casting. An air-fuel mixture inlet opening 11 is formed outwardly and obliquely (left frontwards) in a rearward, oblique end wall portion of the manifold body 10. And the carburetor 2 is installed with the flange thereof on the outside surface 12 of the left oblique portion provided with the mixture inlet opening 11. An air-fuel mixture outlet opening 15 is formed through the length and breadth of the back face 13 of the manifold body 10 at the side of the engine E so as to extend to all of the intake ports 14a,14b,14c which are arranged bilaterally in the front of the engine E.

Figure 5:
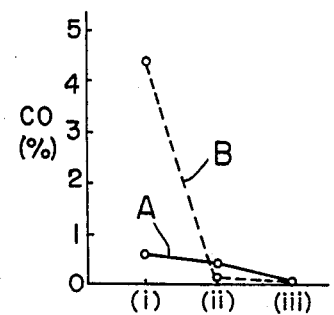
FIG. 5 is a specific graphical representation showing a CO-density in an exhaust gas from each cylinder.
Figure 6:
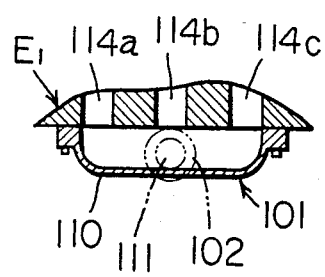
FIG. 6 and FIG. 7 are schematic transverse horizontal sectional views showing the constructions of prior art intake manifolds respectively.
Figure 7:
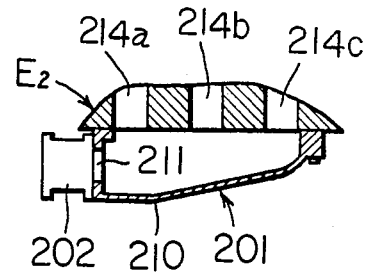

Accordingly, the density of the air-fuel mixture supplied to each cylinder i,ii,iii through each intake port 14a,14b,14c is nearly uniformized owing to the above-mentioned construction of the intake manifold 1. For example, in the case that the oblique angle $\alpha$ of the outside surface 12 for installing the carburetor 2 relative to the back face 13 of the manifold body 10 is set at 0 degree, the measurement result of the CO-density in the exhaust gas from each cylinder i,ii,iii is shown by the broken line B in FIG. 5. On the other hand, in the case that the oblique angle $\alpha$ is set at 35 degree, the measurement result thereof is shown by the solid line A in FIG. 5. According to the measurement result, in the case of $\alpha=0$ degree, it can be understood that an imperfect combustion is apt to be caused by the over rich density of the sucked mixture in the left cylinder i, and on the contrary a misfire is apt to be caused by the lean density of the sucked mixture in both middle and right cylinders ii,iii. And in the case of $\alpha=35$ degree, it can be understood that the density of the sucked mixture in each cylinder i,ii,iii is nearly uniformized to each other.

Further, the intake manifold 1 is provided with a heating means for vaporizing an unvaporized fuel in the intake manifold, particularly an unvaporized fuel collected in the bottom thereof, by the heat of the cooling water for the engine E.

Figure 3:
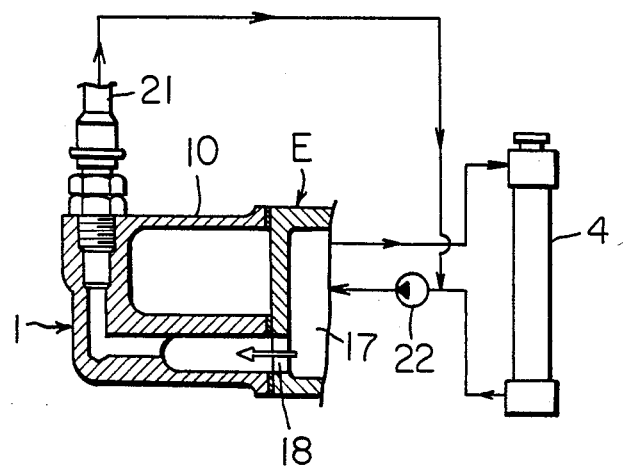
FIG. 3 is a sectional side view showing a cooling water circulation line for an engine according to the present invention.

That is, a pair of water chambers 16, 16 are formed bilaterally within the lower longitudinal wall of the manifold body 10 to supply the engine cooling water therein. And each water chamber 16,16 is connected respectively at the left end and at the right end thereof to each feed water port 18,18 provided in a head jacket 17 of the engine E. The middle portion of the front wall of the manifold body 10 is provided with a discharge port 20 which is connected to two branched channels 19,19 each of which is connected to the water chamber 16,16 respectively in order to return and circulate the engine cooling water from the front middle portions of the water chambers 16,16 to the head jacket 17 through a hose 21 by the use of a circulating water pump 22 as shown in FIG. 3.

As described above, liquid fuel particles in the air-fuel mixture are sucked into the manifold body and fly obliquely from the rearward end wall portion to the back other end wall portion therein. Accordingly, one portion of the particles flows into the intake port disposed at the rearward end wall portion of the cylinder head and the remaining portion of the particles flows into the middle intake port and then into the other, most forward intake port in turn by the help of the face of the cylinder head. Consequently, the particles are distributed nearly uniformly to every intake port. Therefore, the density of the air-fuel mixture sucked into every cylinder is nearly uniformized to each other to get a value appropriate for a good combustion, and then the imperfect combustion due to the over rich density thereof and the misfire due to the lean density thereof can be effectively prevented to continue a good and stable combustion.

Preferably, the engine E is configured to include a cylinder head face 23 which is planar so that face surface portions 23a between the intakes 14a, 14b and 14c are coplanar with peripheral face surface portions 23b. As shown in FIG. 1, preferably a rearward edge portion 11a along the inlet opening 11 is located rearwardly of a rearward edge portion 14d along the left, most rearward intake 14a and a forward edge portion 11b along the inlet opening 11 is located longitudinally between the rearward edge portion 14d and a forward edge portion 14e along the left intake 14a.

It is to be understood that the present invention may be embodied in other specific forms without departing from the spirit or essential characteristics of the present invention. The preferred embodiments are therefore to be considered illustrative and not restrictive. The scope of the invention is indicated by the appended claims rather than by the foregoing descriptions, and all changes or variations which fall within the meaning and range of the claims are therefore intended to be embraced therein.

We claim:

1. An intake manifold for a three-cylinder air-fuel mixture suction type engine having three engine intake ports, said intake manifold comprising a body defining an elongate manifold chamber, said body having a chamber inlet opening formed in a first end wall portion thereof, said first end wall portion adapted to receive a carburetor in fluid communication with said inlet opening, said body being open longitudinally along a back face portion so as to define an outlet opening sufficient to extend over all three intake ports of a three-cylinder engine, said inlet opening being directed longitudinally toward an opposite end wall portion of said body and obliquely toward said back face portion, said first end wall portion adapted to receive the carburetor so that the carburetor is aligned obliquely at an acute angle with respect to a plane defined by said back face portion of said body;

said body configured to be received by a planar cylnder head face so that said chamber inlet opening is located adjacent the rearward one of the three intake ports and said opposite end wall portion is adjacent the forward one of the three intake ports, a rearward body edge portion along said chamber inlet opening being located rearward of a rearward engine edge portion along the rearward intake port, a forward body edge portion along said chamber inlet opening being located longitudinally between the rearward and a forward engine edge portion along the rearward intake port.

2. The intake manifold according to claim 1, wherein an intermediate space of the manifold body chamber is deeper than opposite end portions of the chamber.

3. The intake manifold according to claim 1, wherein an outside, planar surface of said first end wall portion receives the carburetor, the outside surface and the plane of the back face portion being at a 35 degree angle.

4. The intake manifold according to claim 1, wherein a longitudinal wall of the manifold body includes passage means for passing engine coolant through said longitudinal wall.

5. The intake manifold according to claim 1, wherein said passage means includes a pair of water chambers, each water chamber having an inlet adjacent one of said first and opposite end wall portions, whereby each water chamber may receive coolant from a head jacket of the engine, each water chamber communicating with a discharge channel at an intermediate location along said longitudinal wall.

* * * * *